Oct. 13, 1964 M. R. GARE 3,152,987
WATER PURIFYING DEVICE FOR AQUARIUMS
Filed Sept. 14, 1961
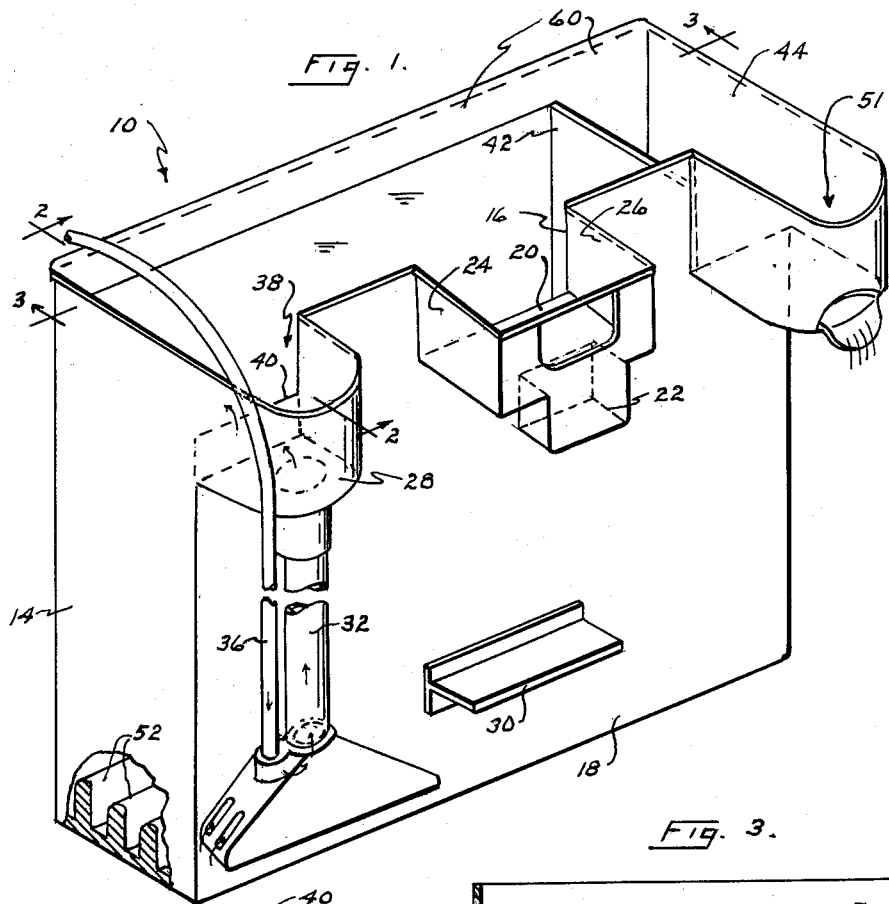
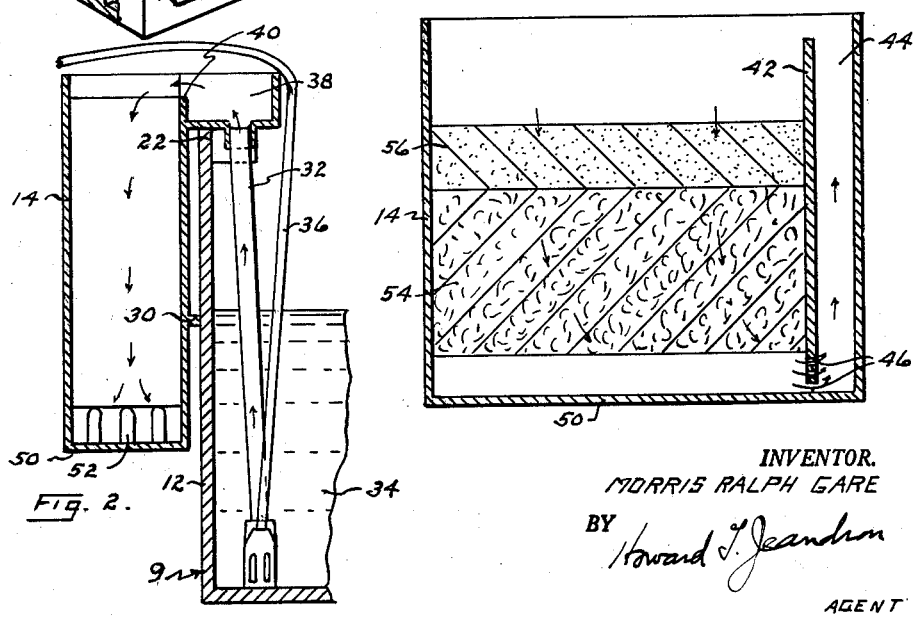
INVENTOR.
MORRIS RALPH GARE
BY Howard J. Jeandron
AGENT

3,152,987
WATER PURIFYING DEVICE FOR AQUARIUMS
Morris Ralph Gare, 309 Hillside Ave., Hillside, N.J.
Filed Sept. 14, 1961, Ser. No. 150,608
1 Claim. (Cl. 210—169)

This invention relates to a filtering and aerating device for the water used in a fish tank or aquaria and more particularly to a means for mounting the device outside the tank.

This device is applicable to large or small aquaria of the type frequently found in the home. The present invention will be described solely in terms of its application to aquaria and fish tanks in the home but it will be understood that it may be similarly applied to any size or shape tank.

In the prior art there are numerous filtering devices and aerating devices for fish tanks, most of them are combined with a siphon which must be started by plunging the siphon into the water and are therefore sometimes difficult to start and are also easily disturbed to interrupt the filtering action. Most of the devices for filtering and aerating the water in fish tanks are located over or in the fish tank and consequently are prone to drip when removed.

An object of this invention is the provision of a combination filtering and aerating device which may be mounted outside a conventional fish tank with only a pair of tubes projecting into the fish tank. There is an important advantage in this arrangement since the filtering and aerating device does not take up any space in the aquarium or obstruct access thereto or block out air or light therefrom. Furthermore, removal or installation of such a device may be effected easily and quickly without disturbing the fish. Moreover, since the device is outside of the aquarium, its outwardly exposed parts remain dry at all times, and hence it may be handled without fear of dripping water upon the surroundings.

A further object of this invention is the provision of a combination filtering and aerating device which requires no siphoning action either to start it or to maintain it in operation.

It is an object of the present invention to make the filtering and aerating operation positive and provide means to stop and start the operation at any time and without any difficulty whatsoever.

A still further object of this invention is to draw the water out of the tank and into the filtering device at a point above the filtering element, filter downwardly through said filtering element and force the water up to a discharge above the level of the filter, it is thereafter returned to the tank.

A further object is to draw water out of the tank and into the filtering chamber and allow the water to pass downward through the filtering chamber, however in the event there is an accumulation of sediment upon the filtering element in the filtering chamber, there is provided an overflow or spillway into the tank to prevent any interruption in the normal flow and to indicate that the filter must be cleaned or replaced.

The filtering device therefore assumes two functions: In the first place, it provides for cleaning the water by allowing the foreign particles therein to penetrate or settle on the filter. In the second place, it provides for a filtering action outside the tank through a filtering element and back into the tank. Should the filtering element become clogged for any reason, an escape spillway is provided through which the water from the fish tank may be short circuited over to the spillway without passing through the filter and without overflowing the filtering device. Despite the fact, therefore, that the filtering device is located outside of the fish tank, there is no danger that said device may over-flow and spill its contents over the floor or table or other support for the tank.

An interesting feature of this invention is the waterfall effect which it provides in the event the filter becomes clogged. The spillway is a relatively wide affair which may be rippled to simulate the ripples in a fast moving stream. When the water spills over it, a miniature waterfall is created.

A still further object of this invention is the provision of a filtering and aerating device of the character described wherein said device is provided with a hook-shaped bracket to support it on the wall of an aquarium, said hook-shaped bracket being fashioned in the form of a spillway and serving the additional purpose of returning the water from said device to the aquarium when the filter is clogged.

Another object of the invention is the provision of an aerating pump for fish tanks and the like, wherein said device utilizes air to pump or raise the water to propel the water into and through a filter and at the same time said aerating device forms bubbles in a tube which projects at one end into the water in the tank and which is connected at its opposite end with a filtering device. As the bubbles are formed in said tube, they carry the water along with them through the tube and into the filtering device.

The invention is illustrated in the accompanying drawing in which

FIG. 1 is a perspective view of a combination filtering and aerating device for fish tanks, the outer wall of said device being partly broken away to expose the inner parts thereof, FIG. 2 is a vertical section on the line 2—2 of FIG. 1, and FIG. 3 is another vertical section taken on the line 3—3 of FIG. 1.

The combination filtering and aerating device 10 shown in the drawing may be mounted on the side wall 12 of a conventional fish tank 9 as shown in FIG. 2. Said device comprises a tank 14 which is closed at the sides and bottom and open at the top. There is a cutout 16 in the front wall 18 of said tank 14 and projecting forwardly therefrom is a forwardly and downwardly sloping platform 20 with a vertically downwardly extending lip or flange 22 along its forward edge. It will be observed in FIG. 2 that this platform 20 with its lip or flange 22 may be hooked over wall 12 of the fish tank 9 and it is in this manner that said filtering and aerating device may be hung outside of said fish tank with only the lip 22 and a pair of tubes shortly to be mentioned disposed on the inside of the fish tank.

A side wall 24 may be secured along one edge to front wall 18 of tank 14 and along another edge to one end of sloping platform 20. It thereby serves as a bracket to support said sloping platform on the front wall of said filter tank 14. At the opposite end of platform 20 is another wall 26 which also serves to properly support said platform on the front wall of said filter tank 14. In addition there is an enclosure 28. The purpose of this enclosure will shortly appear. Adjacent the bottom of front wall 18 is a shelf 30. This shelf functions solely as a spacer between the lower portion of tank 14 and wall 12 of fish tank 9. As can readily be seen in FIG. 2, shelf or spacer 30 tends to hold the filter tank in a vertical position against said fish tank.

Projecting downwardly from enclosure 28 is a tube 32. It will be observed that this tube projects into the water 34 in the fish tank. Paralleling tube 32 is a second tube 36. The lower end of tube 36 is connected to the lower end of tube 32, a short distance above the opening at the lower end of said tube 32. The upper end of tube 36 is conventionally connected to a conventional air pump which forms no part of this invention and is therefore not shown in the drawing. It will be observed in FIG. 2 that the upper end of tube 32 communicates with the chamber 38 within enclosure 28. The lower end of tube 36 communicates with the inside of tube 32 above the lower opening in said tube 32. When air is pumped into tube 36, said air passes into tube 32 and since tube 32 projects into the water in the fish tank, air bubbles are formed in said water. These bubbles rise and carry the water along with them through tube 32 and into chamber 38.

It will be seen in FIG. 2 that chamber 38 communicates with tank 14 over a shortened wall 40 in enclosure 28. The water which is thus brought into chamber 38 passes over said wall 40 and enters the tank 14. It will be observed at this point that a vertical partition 42 is provided in tank 14 adjacent wall 26. This partition is secured along its two vertical edges to the front and back walls of tank 14 but its upper end does not reach the top of the rear wall nor does its bottom end reach the bottom wall of said tank 14. Consequently, a chamber 44 is formed between one end wall of tank 14 and partition 42 and the water which is brought into chamber 38 is caused to flow over wall 40 and then down into said tank through openings 46 and into an outlet chamber 44. See the arrows in FIG. 3.

The opening 46 which is provided between the lower end of partition 42 and the bottom wall of tank 14 may be a plurality of openings which allows the water entering the tank 14 to pass into the outlet chamber 44. It will be observed that formed on bottom wall 50 of tank 14 is a plurality of spaced ridges 52. These ridges support the filter proper comprising glass wool 54 or the like and a layer of charcoal 56 or the like disposed upon said glass wool. The water passing through the tank through the glass wool and charcoal enters the spaces between said ridges 52 and whatever sediment or foreign matter that said water contains and is free to settle out will settle out upon the filtering material. The water will then rise in the chamber 44 and then spill over the spillway 51 and back into the fish tank 9.

The entire device herein described may be made of plastics and either molded or fabricated to the shape and features shown in the drawing. The entire unit will thereby be kept light in weight and yet strong and also easily kept clean. Regarding this question of keeping the unit clean, it will be observed that a plate 60 may be provided across the top of enclosure 28 and the tank 14 to keep the dust out of said enclosure and tank. The unit is readily removable from the fish tank and the glass wool and charcoal are readily removable and replaceable. The floor of the tank 14 is thereby exposed so that any sediment thereon may be cleaned out without any trouble whatsoever.

Should it happen that the filtering elements 54 and 56 will become clogged with foreign matter and impassable to the water, all that will happen will be that the water in enclosure 28 and tank 14 will flow over spillway 20.

Although the device has been shown in a particular configuration (rectangular) it may be of any shape to conform with the fish tank or its surroundings without departing from the spirit of this invention and although the device has been shown as mounted on the side wall of a fish tank it may be similarly mounted on any similarly shaped wall or bracket as long as the projecting portion of the device extends over the body of water that is to be filtered and although the device is shown as constructed in a clear plastic material it may be similarly constructed of any rigid impervious material without departing from the spirit of this invention and this invention shall be limited only by the appended claim.

What is claimed is:

A filtering device for use on fish tanks and the like, comprising a filter tank, supporting means for supporting said filter tank exterior to said fish tank on the wall of said fish tank and positioned high enough to allow gravity flow return, a filter supported in said filter tank a spaced distance above the bottom wall of said filter tank and a spaced distance below the top of said filter tank, thereby providing a lower compartment below the filter and an upper compartment above the filter, a water inlet provided in said filter tank and communicating with said upper compartment, a water outlet chamber provided in said filter tank and communicating with said lower compartment and a water outlet in said chamber, and means for drawing the water out of the fish tank and sending it through said filter tank whence it gradually settles through said filter tank into said lower compartment and then gradually rises in said outlet chamber and means to pass through said water outlet and falls back into the fish tank by gravity, whereby impurities may be trapped within or upon said filter by said filter, and mostly within said upper compartment before the water is returned to the fish tank, said supporting means for supporting the filter tank on the wall of a fish tank comprising a generally hook shaped bracket which is connected to the upper end of the filter tank and located in a central position and which is adapted to be hooked over the fish tank wall and thereby to support the filter tank on the outside of said wall said upper compartment, having a platform over said hook shaped bracket which may be pitched slightly from the water in the filter tank toward the fish tank, whereby said platform serves as a spillway to carry any overflow water from the filter tank to the fish tank, the means for drawing water out of the fish tank and sending it through the water inlet of the filter tank comprising a tube which communicates at its upper end with said water inlet and which extends downwardly on the inside of the fish tank wall into the water in said fish tank, the lower end of said tube communicating with said fish tank, and a second tube which extends downwardly into the fish tank, its upper end being adapted to be connected to an air pump, the lower end of the second tube communicating with the lower end of the first tube, whereby air may be pumped downwardly through the second tube to carry water up through the first tube and into the water inlet of the filter tank.

References Cited in the file of this patent

UNITED STATES PATENTS

| | | |
|---|---|---|
| 2,275,428 | Haldeman | Mar. 10, 1942 |
| 2,737,490 | Lambertson | Mar. 6, 1956 |
| 2,822,925 | Lambertson | Feb. 11, 1958 |